United States Patent [19]

Abecassis

[11] Patent Number: 5,696,869
[45] Date of Patent: *Dec. 9, 1997

[54] VARIABLE-CONTENT-VIDEO PROVIDER SYSTEM

[76] Inventor: Max Abecassis, 19020 NE. 20 Ave., Miami, Fla. 33179

[*] Notice: The term of this patent shall not extend beyond the expiration date of Pat. No. 5,434,678.

[21] Appl. No.: 307,910

[22] Filed: Sep. 19, 1994

Related U.S. Application Data

[62] Division of Ser. No. 832,335, Feb. 7, 1992.

[51] Int. Cl.$^6$ .................................................. H04N 5/76
[52] U.S. Cl. ........................... 386/52; 386/69; 386/125
[58] Field of Search ............................. 358/335, 311; 360/13, 14.1, 14.2, 14.3, 33.1; 348/6, 7–8, 12–13; 380/10, 20; 386/4, 52, 68–70, 83, 46, 124–126; H04N 5/76

[56] References Cited

U.S. PATENT DOCUMENTS

| | | | |
|---|---|---|---|
| 4,605,964 | 8/1986 | Chard | 358/147 |
| 4,685,131 | 8/1987 | Horne | 380/20 |
| 4,729,044 | 3/1988 | Kiesel | 360/14.3 |
| 4,872,151 | 10/1989 | Smith | 369/14 |
| 4,888,796 | 12/1989 | Olivio, Jr. | 379/87 |
| 4,920,432 | 4/1990 | Eggers et al. | 360/33.1 |
| 4,930,158 | 5/1990 | Vogel | 380/5 |
| 4,930,160 | 5/1990 | Vogel | 380/23 |
| 4,947,244 | 8/1990 | Fenwick et al. | 358/86 |
| 4,949,187 | 8/1990 | Cohen | 358/335 |
| 5,057,932 | 10/1991 | Lang | 358/335 |
| 5,060,068 | 10/1991 | Lindstrom | 358/185 |
| 5,109,482 | 4/1992 | Bohrman | 395/154 |
| 5,130,792 | 7/1992 | Tindell et al. | 358/85 |
| 5,172,111 | 12/1992 | Olivio, Jr. | 360/27 |
| 5,218,672 | 6/1993 | Morgan et al. | 360/14.1 |
| 5,274,463 | 12/1993 | Matsumoto et al. | 358/335 |
| 5,313,297 | 5/1994 | Fukui et al. | 348/7 |
| 5,434,678 | 7/1995 | Abecassis | 358/335 |

*Primary Examiner*—Thai Tran

[57] ABSTRACT

A video delivery system and methodology for storing a plurality of videos and video segment maps, each of the video segment maps defining a plurality of video segments of a corresponding video, the plurality of video segments comprising non-sequential parallel, transitional, and overlapping video segments; receiving from a remote video retriever a request for a video, the request providing for a keyword; establishing video content preferences of the remote video retriever; selecting video segments responsive to an application of the video content preferences to a video segment map of the requested video; retrieving the selected video segments; and providing the retrieved video segments to the remote video retriever.

17 Claims, 6 Drawing Sheets

Program Content Rating

| Code | Description | None | Implied | Explicit | Graphic |
|---|---|---|---|---|---|
| 110 | Profanity | 1 | | 3 | 4 |
| 130 | Violence | 1 | 2 | 3 | |
| 135 | Bloodshed | 1 | | 3 | 4 |
| 150 | Monsters | 1 | 2 | 3 | |
| 170 | Nudity | 1 | 2 | 3 | 4 |
| 175 | Sex | 1 | 2 | 3 | |

541 points to row 135. 542 points to Sex/Explicit cell.

543 — Please enter the code for the category to modify: 135
Please enter the level for this category: 1 — 544

EXIT | HELP | PREV | NEXT | | PLAY
STOP | PAUSE | REW | FF | SKIP | PLAY

545

Video Scene Category Rating Structure 100

| Code | Description | None | Implied | Explicit | Graphic |
|---|---|---|---|---|---|
| 110 | Profanity | 1 | 2 | 3 | 4 |
| 130 | Violence | 1 | 2 | 3 | 4 |
| 135 | Bloodshed | 1 | 2 | 3 | 4 |
| 150 | Monsters | 1 | 2 | 3 | 4 |
| 170 | Nudity | 1 | 2 | 3 | 4 |
| 175 | Sex | 1 | 2 | 3 | 4 |

FIG. 1A

Video Scene Element Rating Structure 200

| Code | Description | None | Minimal | Expanded | Extensive |
|---|---|---|---|---|---|
| 210 | Character | 1 | 2 | 3 | 4 |
| 220 | Location | 1 | 2 | 3 | 4 |
| 230 | Time | 1 | 2 | 3 | 4 |
| 340 | Detail | 1 | 2 | 3 | 4 |
| 420 | Expertise | 1 | 2 | 3 | 4 |

FIG. 1B

Video Scene Inclusion Rating Structure 300

| Code | Description | Highlight | Summary | Condensed | Detailed |
|---|---|---|---|---|---|
| 610 | Inclusion | 1 | 2 | 3 | 4 |

FIG. 1C

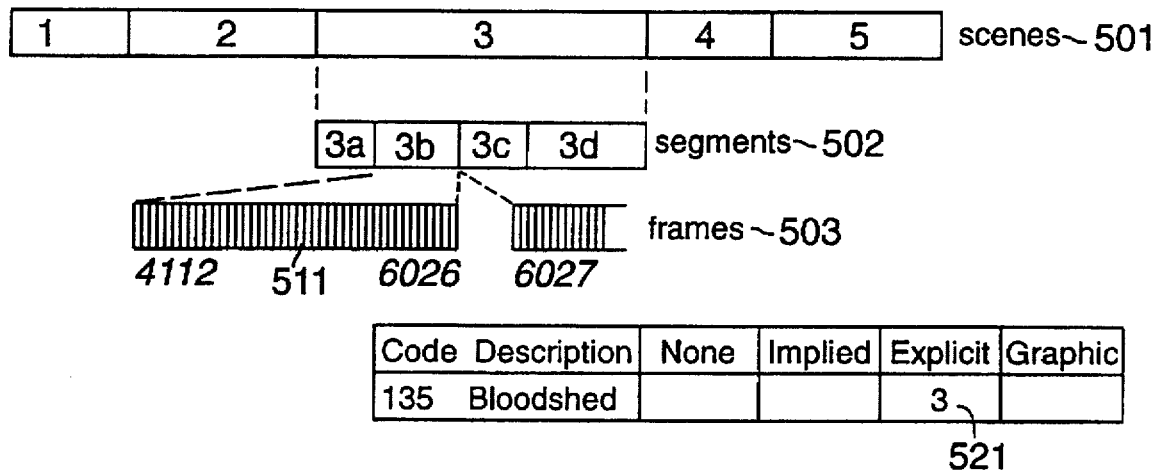
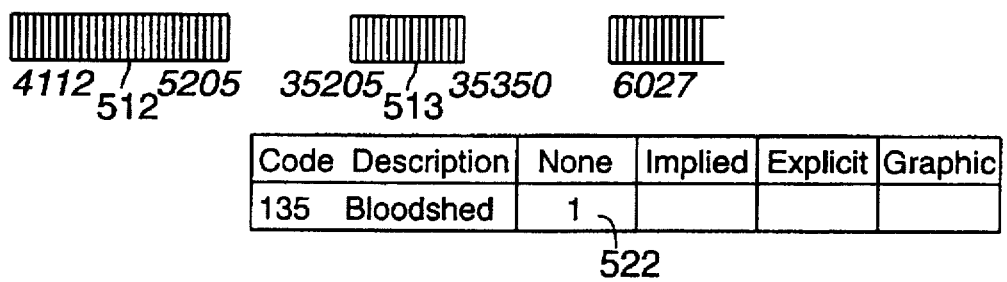
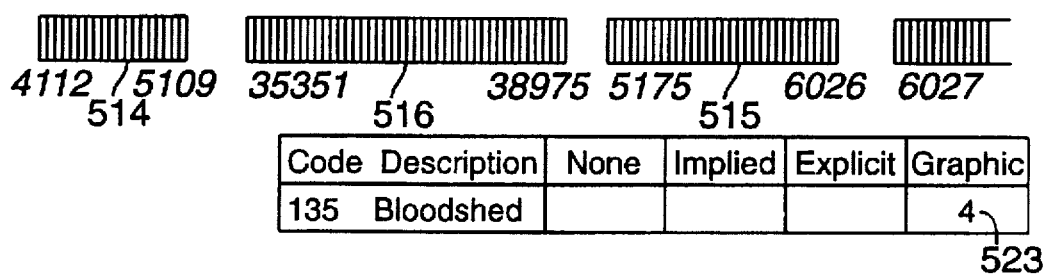
FIG. 3

Program Content Rating

| Code | Description | None | Implied | Explicit | Graphic |
|---|---|---|---|---|---|
| 110 | Profanity | 1 | | 3 | 4 |
| 130 | Violence | 1 | 2 | 3 | |
| 135 | Bloodshed | 1 | | 3 | 4 |
| 150 | Monsters | 1 | 2 | 3 | |
| 170 | Nudity | 1 | 2 | 3 | 4 |
| 175 | Sex | 1 | 2 | 3 | |

Please enter the code for the category to modify: 135

Please enter the level for this category: 1

| EXIT | HELP | PREV | NEXT | | PLAY |
|---|---|---|---|---|---|
| STOP | PAUSE | REW | FF | SKIP | PLAY |

FIG. 4

VARIABLE-CONTENT-VIDEO PROVIDER SYSTEM

This is a divisional application of prior application Ser. No. 07/832,335, filed Feb. 7, 1992.

BACKGROUND OF THE INVENTION

1. Field of the Invention

This invention relates to an automated control system and method that furnishes viewers with individualized automated editing and retrieval capabilities over the contents and length of a variable content video program in order to produce a transparently continuous and complete show. The system capabilities include an automated flexible control system design that enables an operator to selectively apply different editing criteria to the variety of subject matters that may be contained within the program. The system controls also include an automated capability for efficiently previewing program scenes of pre-identified categories and classes of subject matter and a capability for determining their inclusion in the program seen by the viewer.

Finally, the control system provide a keyword/menu segment/program retrieval facility from an existing program and program database, and a requesting capability for programs to be produced according to viewer-specified requirements.

2. Background of the Prior Art

Artistic expression in films often surrender to the requirements of marketing and other forms of censorship, both subtle and obvious. Individual viewers once they elect to view a program, subject themselves to the results of this censorship or lack thereof.

One form of industry censorship is content rating which is a label attributed to each film by the Motion Picture Association of America ("MPAA"). The label serves as a broad generalized guide for the public as to the overall level of "objectionable" content, as the MPAA defines various types of content that may be included in a movie. In the MPAA published booklet "The Voluntary Movie Rating System", the MPAA spells out the purpose of the rating system: "if you are 17 or over, or if you have no children, the rating system has no meaning for you. Ratings are meant for parents, no one else." Accordingly, the rating system used by the MPAA has adopted a generalized structure that has inherent limitations since it admittedly has ignored the varying sensibilities and tastes among different adults e.g. non-parents, young adults, or senior citizens. The rating system is thus inadequate for a large portion of the viewing public. Nonetheless, any reviews that may have been obtained, the public must elect the option of viewing the film or not. Having decided to do so, the viewer, must accept the content of the film in its entirety.

User content requirements may also include the knowledge level required to view the program, its level of detail and complexity such as would be the case in educational programs. In programs that include a number of segments such as is generally the case with news programs, there is no choice provided to the user as to the viewing of only the user specified program segments. Similarly, while the viewer has the option to truncate the length of a program by either terminating viewing the program, or if recorded to fast-forward certain scenes, there is no option of receiving a program at a user specified length.

Presently, all form of viewer editing, such as permitted by the use of a VCR, requires the interactive participation of the viewer and some knowledge as to the location of the scene in question.

Many methods and systems found in the prior art do not incorporated current basic technology and methods to produce an automatic viewer editing capability that produces a transparently complete program.

For example, the patent to Von Kohorn, U.S. Pat. No. 4,520,404, discloses a remote recording and editing system. In particular, the invention discloses an editing system whose functions include the activation or deactivation of a television receiver and a recording apparatus by the transmission of control or editing command signals, generated from a central station where an operator monitors a broadcast transmission. The receiver and recorders in a viewer's home are provided with inhibiting circuitry that respond to the transmitted control signals from the central station to prevent the re-broadcast or recording of unwanted material in the home.

The patent to Chard, U.S. Pat. No. 4,605,964, discloses a television controller that utilizes coding for identifying and automatically deleting undesirable sound and visual events broadcast with a program. The content signals associated with Chard also teaches that undesirable events are graded to permit editing according to personal taste.

Also, the patent to Olivo, Jr., U.S. Pat. No. 4,888,796, discloses a screening device capable of automatically disabling the TV or video receiving device in response to the receiver's recognition of a non-interfering material content signal co-transmitted with the program signals.

However, Von Kohorn, Chard, and Olivo, have various drawbacks. The material content signal may only be applied to portions of a program signal, in order to edit out only the objectionable parts of a program. Thus by disabling the replay of segments of the program material, these methods ignore the fact that dead segments would result from the edited out segments. Also, while Chard suggests setting grading levels independently for sound (four levels) and vision (four levels), it does not teach providing grading levels for a variety of subject matters. Additionally, while Olivo, illustrates incorporating the rating structure provided by the MPAA for the programs, and suggesting that different material content signals can distinguish between different forms of subject matter, it does not teach using a number of different ratings for each class of subject matter. In this regard, Vogel's disclosure of three broad classifications (advertisement, non-program material, restricted) does not enhance Olivo. The above teachings therefore together show a method whose rating structure is based on the MPAA rating system applied to different subject matters. However, as previously discussed, the MPAA rating system was designed and intended as an overall program guide for parents. The MPAA rating system does not by, deliberate design, address segment specific subject matter information that is required to provide adults with a highly discriminatory control over the content of segments contained within the selected program.

The patent to Vogel, U.S. Pat. No. 4,930,160, addresses the above deficiency by providing a facility for displaying alternative material during the dead segments. The alternative material selected during censorship periods can originate from a remote source, for example, another television broadcast, or locally, for example, from a video disk or tape player. The local source may also simply be a black signal generator which essentially reproduces the same drawback noted above. An alternate source to a dead segment may also be provided by the system disclosed in Boyd et al., U.S. Pat. No. 5,023,727. Boyd teaches a method for forming a substantially continuous composite video signal by combining a video segment received from a video signal with a video segment produced from digital data.

The patent to Lindstrom, U.S. Pat. No. 5,060,068, discloses an optical laser disc based broadcasting method and system wherein promotional segments of a program are played from the same source recordings as the program itself. Lindstrom discloses utilizing at least two disc players in timed synchronization to generate a transparently continuous video signal.

The patent to Kiesel, U.S. Pat. No. 4,729,044, discloses a plurality of video tape recorders that similarly provide for continuous replay without the need for creating a master tape.

Neither Lindstrom nor Kiesel however teach a single player that can provide transparently continuous video signals, nor do these references suggest utilizing a control system that provides a variety of different and complete edited versions of the same program obtained from the same single source recording.

Neither Boyd nor Vogel, however, provide a system that creates, from a single source, a viewer-edited transparently continuous and harmonious program that replaces a dead segment with other parts of the same program.

Generally, to the extent that the above patents act to censor a video program they direct themselves to providing viewer control over the form of the expression. This is in contrast to those patents, that provide viewers the means to participate, and thereby affect, the program's story lines or plot. An example of the latter type of patent is Best, U.S. Pat. No. 4,569,026. Which discloses a video entertainment system where human viewers conduct simulated voice conversations with screen actors or cartoon characters in a branching story game shown on a television screen. Best is further characterized by the interactive nature of viewer participation, since at frequent points in the game the system presents the viewer with two or more alternatives. Is the interactive participation of the viewer that sustains the logical progression of the game. As many games are directed at children, and are educational in nature, or contain primitive subject matter, they have not dealt with issues raised by the more complex adult forms of expression inherent in contemporary films. Games have provided setup editing capabilities (selection of: level of difficulty, character, weapons, etc.), not censoring editing capabilities.

The present art thus fails to suggest combining interactive and set up capabilities, automated editing capabilities, and directing capabilities to provide the user with control over a program's story line, content, and form of expression.

The patent to Freeman, U.S. Pat. No. 4,573,072, discloses a method for expanding interactive CATV displayable choices for a given channel capacity. The preferred embodiment of the invention includes a program segment stacking method and a subscriber profile utilized to transmit one of a plurality of the stacked program segments. The subscriber's selection profile disclosed therein is demographic in character and can be changed from the head end of the transmission, and not editorial and controlled by the viewer. Further, the method of Freeman teaches that the stacked segments beginning at any one moment of time to be of equal duration to restore the transmission to the common prerecorded television message. This structure, which serves Freeman's objectives of tailoring advertising to the demographics of the viewer, is inferior to a variable length stacking structure that would provide far superior tailoring of the program content.

The patent to Bohn, U.S. Pat. No. 4,888,638, shows a market research system for substituting stored television programs for regularly scheduled, broadcast television programs having a particular identification code wherein the substitute television programs may be transmitted via telephone lines to the households of cooperating panelists for storage. The operational difference between Freeman and Bohn is the method of transmitting the alternate advertising segment to the viewer. In Freeman different advertising segments are contemporaneously transmitted during the broadcast of the program, while in Bohn differing advertising segments are transmitted prior to the broadcast of the program. Bohn teaches the use of a laser disc to store the substitute television advertising. Based on the identification code contained in the broadcast program a controller may substitute the broadcasted advertisement.

The patent to Skutta, U.S. Pat. No. 5,055,924, discloses a method for the remote-controlled replacement of a TV advertising spot by another advertising spot for a new product to be tested.

The teachings of the above references would not furnish a system that provides each viewer with automated non-previewed control over the program content from a single program source by a single device that generates a transparently seamless program matching the viewers pre-established content requirements. Among the additional elements and enhancements required by such a system would be producing and providing coherent parallel and overlapping program segments. Some of these parallel segments differ only in the form of expression (i.e. explicitness) of a given scene.

The patent to Hashimoto, U.S. Pat. No. 4,745,549, discloses a method of generating an individualized listing of programs that meet an individual viewers stated program preferences. This is accomplished on the basis of a generalized survey of a viewers program classification preferences and viewer response to the list selected.

The patent to Hallenbeck, U.S. Pat. No. 5,038,211, relates to television (TV) program schedule guides and in particular to a method and apparatus for efficiently transmitting, receiving and storing television program schedule information. In Hallenbeck, schedule information is retained that meets predetermined selection criteria to minimize storage and processing requirements.

The above patents do not suggest viewer direct selection of a program from a variety of programs by means of a database architecture that would permit keyword and interactive menu searches.

The patent to Monslow, U.S. Pat. No. 4,995,078, teaches a television broadcast system using land lines for the real time transmission of a viewer chosen program. The patent to Way, U.S. Pat. No. 4,891,694, is entitled "Fiber optic cable television distribution system". The patent to Walter, U.S. Pat. No. 4,506,387, discloses a programming on demand fiber optic based system. These patents together with the references cited therein teach a variety of land line and fiber optic transmission of programs with varying degrees of viewer capabilities in the selection of programs. While these do not teach transmission of a variable content program, said works are, incorporated by reference herein to establish that such a transmission is possible and to assist the reader interested in obtaining a more detailed disclosure of the hardware of such systems than is necessary to provide here.

SUMMARY OF THE INVENTION

In view of the foregoing shortcomings of the prior art, it is evident that there exists a need for a system that furnishes viewers with individualized automated non-previewed control over a program's content in a single program source, and broadcast on a viewing device, by a transmitting device that generates a transparently seamless video program matching the viewers preestablished content requirements.

It is also an object of the present invention to include the capabilities for automatically selecting among parallel and overlapping segments to provide a video program that is highly responsive to viewer control over its content. A further object of the invention is to provide content control that includes any of the following: the program's form of expression, subject matter, element development, expertise level, detail level, and program length.

It is yet another object of the invention to provide a TV control system where the control is exercised automatically, by means of a preestablished content preference structure and keyword subject listing, individualized for each viewer and subject to password control by a system administrator. This first form of control is applied universally to each selected program content map. Each map contains detailed information as to the location and program characteristics, such as categories and subject matter, of the various segments of the program. The second form of control may be established interactively and individually with each selected program prior to initiating viewing.

It is also an object of the present invention to provide the capability for efficiently previewing selected scenes in order to indicate their inclusion for viewing. Inclusion/exclusion control is automatically accomplished by modification of the program content map as may be required for example by a parent editing a children's program. Additionally, the viewer accessible copy of the program's content map may be modified contemporaneously with the viewing of the program, generating a variety of any one of the following preselected automated system responses: updating the copy of the program's content map, skipping to the next logical segment, or any combination of the two. The skipping to the next logical segment feature may be accessed independently without affecting the content map.

It is also an object of the present invention to provide automated capabilities to efficiently view only a specified class, category, or subject matter included in segments within the selected program or programs.

It is also an object of the invention, to provide information as to the viewer preference structure and the program content map to which it was applied to assist in determining viewer preferences.

It is also an object of the present invention to provide viewers the means of accessing available programs, segments from a program, and or segments from a plurality of programs by the use of keyword or a classification tree structure as would be required by a user accessing a very large program or segment database.

It is also an object of the present invention to provide the means for a viewer to detail the subject matter, story line, and or general content of a desired program so that producers of programs may elect to produce and provide said program.

Briefly these and other objects of the invention are accomplished by a system comprising: program production, editing, and recording techniques, assignment to segments of a program the appropriate descriptors and creating a map of those segments and their descriptors, a structure to record the viewer's content preferences, the means by which the user content preference structure is matched to the programs's content map to produce the desired program, means of accessing and retrieving programs, and means of indicating program preferences.

With these and other features, advantages and objects of this invention, the invention is shown in the detailed description of the invention and in the accompanying drawings and appended claims.

BRIEF DESCRIPTION OF THE DRAWINGS

FIG. 1A is a video segment rating chart for subject matter as per the present invention;

FIG. 1B is video segment rating chart for elements as per the present invention;

FIG. 1C is a video segment rating chart for inclusion as per the present invention;

FIG. 3 is a set of diagrams and rating chart of three versions of a video segment, each a variation of the other as per the present invention;

FIG. 4 is a sample viewer scene selection screen of a program's content rating as per the present invention;

DETAILED DESCRIPTION OF THE PREFERRED EMBODIMENTS

Figure 2:
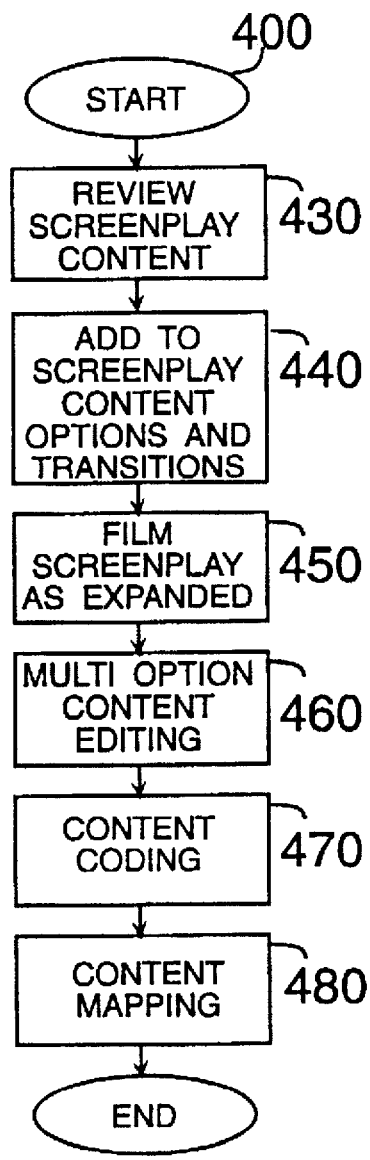
FIG. 2 is a schematic diagram representing the steps of producing a variable content program of the present invention.

As used herein segments refers to a sequence of frames. The segment or frame sequence may form a single image, a shot, a scene, or a sequence of scenes. Any number of segments that may comprise a program may be logically organized by means of the programs segment map. Program refers herein to any image displayed on any device including but not limited to televisions, CRT, film screens; and transmitted to the device by any number of means including but not limited to broadcast, cable, telephone, fiber optic network, tape, videodisc, magnetic media, memory devices, chips and modules.

Referring now in detail to the drawings wherein like parts are designated by like reference numerals, throughout, FIG. 1A illustrates an example of the generalized rating structure 100 utilized to review the contents of each segment contained in a given program. The structure of chart 100 includes a number of categories 102 that might apply to most films. The generalized rating scale 104 mirrors the rating system utilized by the Motion Picture Association of America (General Audiences, Parental Guidance Suggested, Parents Strongly cautioned, Restricted, No Children Under 17 Admitted, G, PG, PG-13, R, NC-17 respectively), but provides a more descriptive rating scale for the group, as shown. Each number in the matrix 106 in the chart 100 represents the particular scene rating choices for a specific scene or segment. A more individualized rating scale for each of the categories is also available as will be described below with respect to FIG. 1C.

Referring now to FIG. 1B, the contents of a segment may be further represented by chart 200 in order to analyze the development of a number of elements 202 such as character, location, and time, as well as the degree of detail 204 and the level of expertise 206 that may be appropriate for a program. These elements are provided at a variety of levels and are rated accordingly. FIG. 1B for example indicates that the program's character element development may range from none to extensive.

Referring to FIG. 1C, a separate category 300 provides criteria for condensed versions of the program. In this chart, the segments may be classified according to the level of inclusion/exclusion that the user may desire 302. The ratings indicates if the segment is required for a highlight, summary, condensed, or detailed versions 304 of the program. In a similar manner, an individualized tailored and descriptive rating scale may be provided for any one category or group of categories.

In a preferred embodiment, each segment is analyzed as to subject matter and assigned the necessary keyword to provide effective keyword retrieval and additional user viewing control capabilities. This will be of significant value in retrieving video segments from a program database ("programbase"), such as may be constructed from a collection of news or educational programs, where each program comprises a number of segments each a whole in itself.

Keyword indexing of the segments provides the capability for inhibiting the viewing of undesirable subject matter, or assisting in the retrieval of desirable subject matter, where the rating structure may not adequately cover a specified category or subject matter. For example, a viewer may not desire viewing scenes of a flag burning. Key word control would inhibit the segments containing that scene or scenes from being viewed by that particular viewer. Alternatively, a key word search would permit a system user to efficiently retrieve all flag burning segments that may be included in the programbase.

FIGS. 1A, 1B, 1C are examples of an overall framework for segment analysis, the actual structure and complexity utilized may be highly tailored, as disclosed in conjunction with FIG. 1C, by the producer of a program to reflect the specific content of a program without being limited by the structures which may be found to be commonly utilized in other works. Each program producer is offered the flexibility within the overall architecture of this rating system to determine and include only those categories that may be relevant to a particular program, and to add categories as the producer requires. Similarly, the producer is offered some flexibility in determining the labelling of the rating scale.

Meeting the objectives of being able to provide both a standardized set of rating structures that will permit the automatic application of a viewers preestablished preference structure on a variety of programs, and provide the producer of the program the flexibility described above, are accomplished by assigning unique classification codes to each set of preestablished standardized categories and by reserving a range of classification codes that will be recognized by the system as requiring interactive input by the viewer. In the example of FIGS. 1A, 1B, 1C, codes ending in 9, codes with a tens digit being a 9, and or codes from 900 to 999 ("producer code") are reserved as independent of the standard categories shown.

Producer codes would signal the system to elicit the viewer preference. Similarly, as the rating scale is relative in structure, different descriptions for any category rating scale might be utilized without affecting the applicability of a preestablished viewer preference structure for that category. In instances where the rating scale is not accommodated by the standardized structure supplied, the producer need only assign a producer code and build whatever scale he may deem desirable, from a simple "Yes/No" to a sophisticated three dimensional representation.

Additionally, commands may be issued by the program to inhibit the application of a preestablished viewer preference structure and require the viewer to address the program's segment rating structure regardless of the category codes utilized.

Referring to FIG. 2, in the preferred embodiment of the present invention a view of the method for mapping the scenes 400 is provided. Each scene or fragment of a scene on a video script is reviewed 430 according to a producer-selected segment rating structure, as indicated in FIGS. 1A–1C above. The screenwriter now has the freedom to expand the scenes to cover a wider rating range without the concern for the limitations inherent in the present art. Without the artificial limitations that a program fit a specified time frame, the screenwriter may additionally expand scenes to provide whatever level of detail or development they may desire. Additionally, the screenwriter may elect to provide any number of scene options and or transitions to each of the scenes identified 340.

Most scenes can be constructed by means of transition segments to provide for content at varying points of the grading scale and or the avoidance of a particular segment and yet retain harmony with the preceding and following segments. It should be noted that any given idea or scene may be expressed in a variety of forms, whether implied as in the closing of a bedroom door, to the graphic treatment as might be found in an "X" rated film. Both of these versions may be provided as parallel segments in a program, challenging the artist to create greater variety in the form of expression permitting the viewer to decide for themselves the level of censorship that they may desire.

A successful filming of this architecture 450 is a function of the skill of the director(s), actors, animators, etc. that may be required to provide for parallel and transition segments with the required transparent harmony.

Existing program editing requires producing a unique linear sequence of segments. The editing of the present invention 460 requires a parallel non-sequential logical arrangements of segments. It should be emphasized that the art of program editing under the present invention transfers censorship and time constrained editing decision making from the producer to the viewer.

The beginning frame and end frame in each of the relevant segments is identified, the segment content is assigned a descriptor as per the category and rating structure, and logical entry and exit references are assigned 470. Any given segment may be assigned a variety of category codes and keywords ("category codes"), and the segment assigned a category code may be congruent in one or more frames with a segment assigned a different category code. Where necessary, a video segment may be associated with more than one audio segment and corresponding separate voice and video category codes may be provided. The complexity of the arrangement is only limited by the requirements, desires, skill, intelligence, hardware, and software available to the program editor.

The resulting segment information is mapped and the required user interface produced 480 to permit the viewer, by selecting the desired rating level in each of the categories, to view a unique continuous sequence of segments consistent with the designated viewer preference structure.

Programs which have been already produced would not offer the same parallel and transition segments, and other opportunities, available to programs produced under this system. A program may, however, nonetheless be mapped to provide an editing-out capability to produce, if not entirely transparently, a continuous program.

To further explain the methods of the present invention, and referring to FIG. 3, and consistent with definitions established at the outset, illustrated is a program consisting of five scenes 501, each scene of the program may comprise any number of segments 502, each segment may include any number of frames 503. In this example, scene three includes four segments, segment 3b begins at frame 4112 and ends at frame 6026. The next segment, 3c, begins at frame 6027. Brakes between set of frames serve to illustrate the beginning and ends of a segment and not to indicate a noncontinuous transmission.

Segment 3b of scene three 511, which might generate an "R" rating for an entire program, includes frames depicting explicit bloodshed. In this example the rating of the segment is indicated by the numeral 3 in the appropriate cell 521 of that segments rating chart.

To provide for the option of editing-out the explicit bloodshed, the program content map includes an additional segment definition beginning at frame 4112 and ending at frame 5205. The end of this segment 512 is linked to a new transitional segment 513 beginning at frame 35205 and ending at 35350, the end of which is linked to frame 6027. In this fashion, frames are omitted and added to provide a continuous transparent edited version of segment 3b. This frame sequence is associated with the corresponding segment content rating to indicate the absence of bloodshed 522. In all other respects the segments 512/513 is equivalent to the original segment 511. For programs produced prior to the present invention, the editing-out would work in a like manner except that the transitional segment 513 would not be available to make the continuous transmission from frame 5206 to 6027 transparent.

To provide for the option to include a graphic level of bloodshed, the program content map includes an additional segment definition. In this case, only 66 frames of the "original" segment 511 are deleted to accommodate the graphic bloodshed included in segment 516 beginning at frame 35351 and ending at frame 38975. This frame sequence (514 to 516 to 515) is associated with the appropriate segment content rating 523.

In this manner, parallel and transitional segments provide a rating selection mix ranging from a segment excluding bloodshed 522 to a segment including graphic bloodshed 523, as well as the segment including explicit bloodshed. As a result, the particular scene of which these segments are a part may be viewed at any of the three rating levels.

A scene may include subject matter of more than one category. In such cases overlapping segments and transitional segments may be provided to permit viewing of one subject matter at one rating level and viewing of another subject matter at another level. For example, barroom brawl of the first westerns were violent but devoid of bloodshed. A current "R" program may result from the contents of twenty or more segments, which would generate forty to sixty additional parallel and transitional segments.

FIG. 4 illustrates a program's content rating chart. This chart merges each of the segment's content ratings of the program for each category. For example, the category bloodshed indicates options to omit the viewing of bloodshed in the program or include explicit or graphic segments 541. Depicted by bold boxes is the viewer selected level for each category 542. The viewer in this case has elected to omit bloodshed in his/her viewing of the program. Each of the viewer's selections may modify or automatically add to the viewer preference structure that is internally saved by the system and applied to other programs that include the same category codes.

The software routines that elicit viewer preference may be as conceptually simple as that illustrated in FIG. 4. A screen display of the program's categories and the optional rating levels and the appropriate viewer selection requests 543. The viewer indicates the category and desired viewing level by depressing a numeric key on the player's remote control unit 544. Indicated on the screen is the function in this context of the control unit command keys. In this illustration, depressing the "Pause" key 545 will cause the display of context sensitive "Help" screens. Context sensitive functions and label of the keys of the control unit enhances the level of communication of the limited number of control keys.

In simplified terms, any segments with a rating higher (abstract) than the viewer-selected rating for a given category would not be included in the program produced for the viewer. The segment selected for viewing (a rating level equal to or next lowest rating) provides the next segment beginning frame information. This will skip over parallel segments of a lower rating than the viewed segment.

As indicated at the outset, the architecture of the system is intended to be hardware independent. That is, a variety of hardware, firmware, and software architectures are possible in the implementation of the present invention. An example of such an implementation of an aspect of the present invention relies on the use of existing laser video disk random access technology to provide the basic apparatus to transmit video information from a single video disk source to a television. The technology supporting a video disk implementation is well established in the art, in fact the hardware required and its operation mirrors that extensively disclosed in the patent to Best (cited previously) and by reference incorporated herein. Therefore, reviewed here and illustrated in FIG. 5 are only those elements of particular interest to the present invention.

Figure 5:
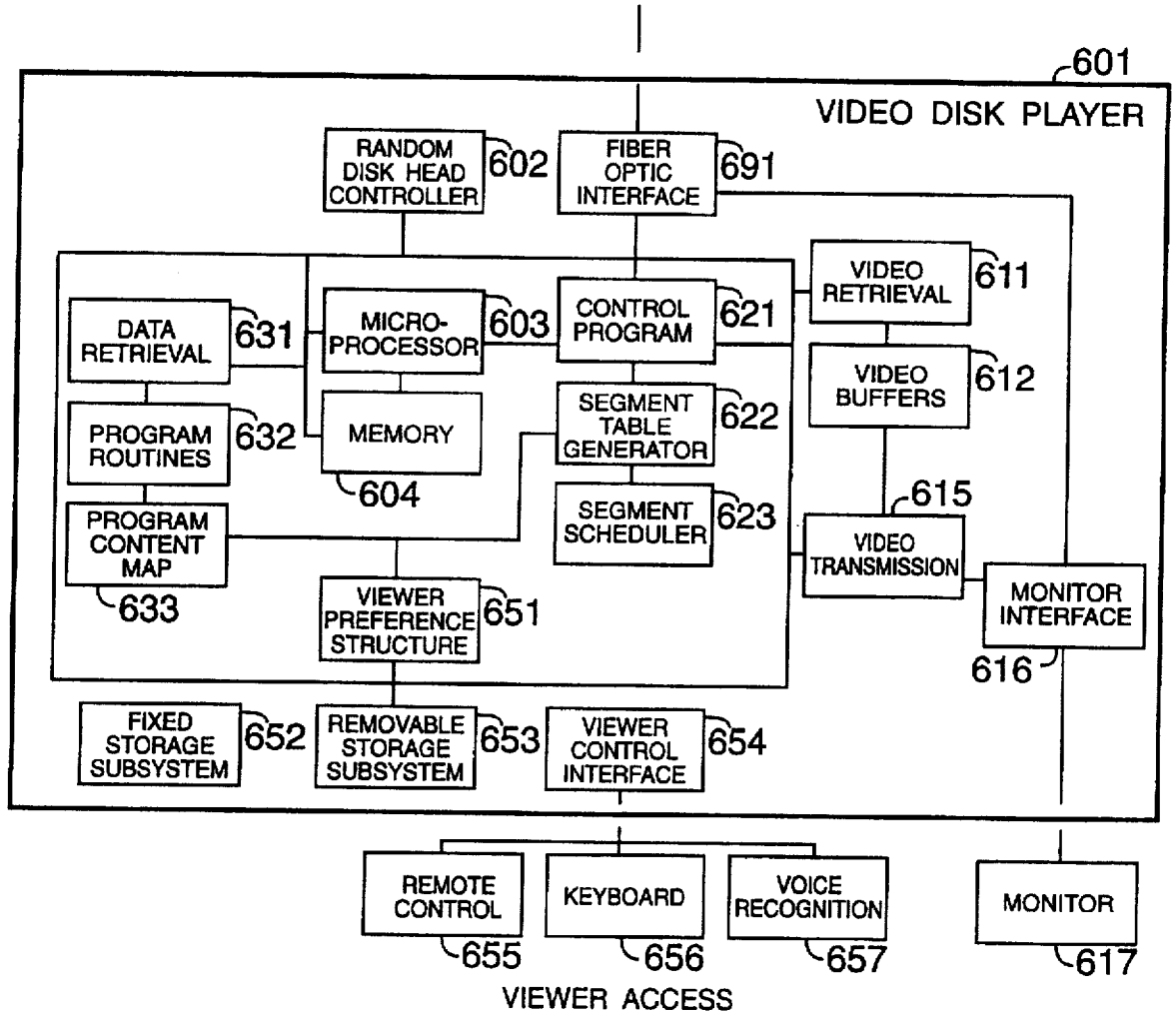
FIG. 5 is a schematic diagram of the video disk player as per the present invention.

Referring now to FIG. 5, the video disk player of the present invention enhances existing readily available video disk player unit 601 and random access technology 602 by including video buffers 612 of sufficient size to permit random positioning of the head (measured in microseconds) to retrieve subsequent frame information from the videodisc without altering the transmission of the required frames per second to provide a transparently continuous video signal transmission to the monitor.

In addition, the video disk player includes a number of computing elements readily available in personal computers to add data retrieval and processing capability. These capabilities permit the control programs to manage the logical retrieval of data and video information. The control program 621, installed in firmware or memory, utilizes micro processor 603 and resident memory 604 to manage the random disk head controller 602 in the retrieval of data 631 and video information 611.

Upon a "play" command, the control program causes the retrieval 631 of the program specific routines 632, and program content map 633 from the video/data disk. The disk contains the map of the program segments, any user interface routines particular to the program, and player control codes, in a format similar to that required by the actual program contained therein. Where the player and the disk include write capabilities, whether in a format similar to the program information or supplementary, as is for example provided by the magnetic architecture disclosed in the patent to Smith, U.S. Pat. No. 4,872,151 incorporated herein by reference, the control program 621 may store in the disk the viewer content preference structure 651 as it relates to the video program contained therein. The control program's storage of user specific information on a video disk is conceptually similar to the storage of user information in game cartridges.

The control program 621, enhanced by the program routines 632, causes the retrieval of the viewer preference structure 651 from either the disk, the player's resident memory 604, fixed storage subsystem 652 (e.g. hard disk drive), removable storage subsystem 653 (e.g. micro floppy disk), or by means of the viewer control interface 654. The latter described in more detail in connection with FIG. 6.

Where the player contains a fixed storage subsystem 652 or removable storage subsystem 653, as indicated above, user information associated with a program may be stored therein, such that upon replay of a program, the player software would read the program's identifier, search the storage for a corresponding viewer preference structure, and upon viewer confirmation, would apply the stored viewer preference structure to the program content map.

The control program 621 generates a segment table 622 based on the integration of the video program's content map 633 and the viewers preference structure. The segment table provides the segment scheduler 623 the data to cause the ordered retrieval of only the video segment consistent with the viewer preferences. The video segments are then transmitted in a transparently continuous manner 615 through the monitor interface 616 to the monitor 617.

Depending on memory and processing capacity of the video disk player, retrieval of data from the appropriate sectors of the video disk, memory, or drives need not be completed prior to initiating transmission of segments of the video program. Specifically the program's content table may be logically segmented to permit concurrent processing and segment table generation with video transmission.

The video disk player's control interface 654 includes communications to the buttons and keys located on the cabinet of the disk player and to the associated control devices. The existing keys provided in these devices are augmented by the following keys or functions, as previously disclosed in FIG. 4,: segment skipping control, preference structure control, segment mapping control, and system menu control.

The viewer control interface 654, in addition to supporting infrared remote control units 655, may support a keyboard 656. The keyboard, as in a personal computer implementation, facilitates system setup, keyword retrieval, and other system functions requiring the entry of alpha characters. A keyboard connector used to connect a standard AT keyboard or any dedicated keyboard may be supplied, or an infrared based keyboard may be implemented instead or in addition. The viewer control interface may also support voice recognition 657. Existing technology can accommodate the few commands, such as play, stop, mute, sound, skip, required to control the basic operation of the video disk player.

In a fiber optic implementation, as will be described below, the video disk player/computer is transformed into an intelligent video retriever/transmitter ("VRT") by adding a two way fiber optic communication interface 691. In a such an implementation, the data retrieval 631 and the video retrieval 611 will be from a source external to the video disk player.

The above described player and disk architecture permits a viewer to interactively modify or create their unique program segment map. For example, a consumer may keyword code the subject matter of the consumer produced video segments (home videos). The keyword code permits the computer assisted retrieval of the selected segments and creation of user defined content maps and indexes. A user-defined index would span the consumer's personal library of such videos, facilitating greater utilization.

Figure 6:
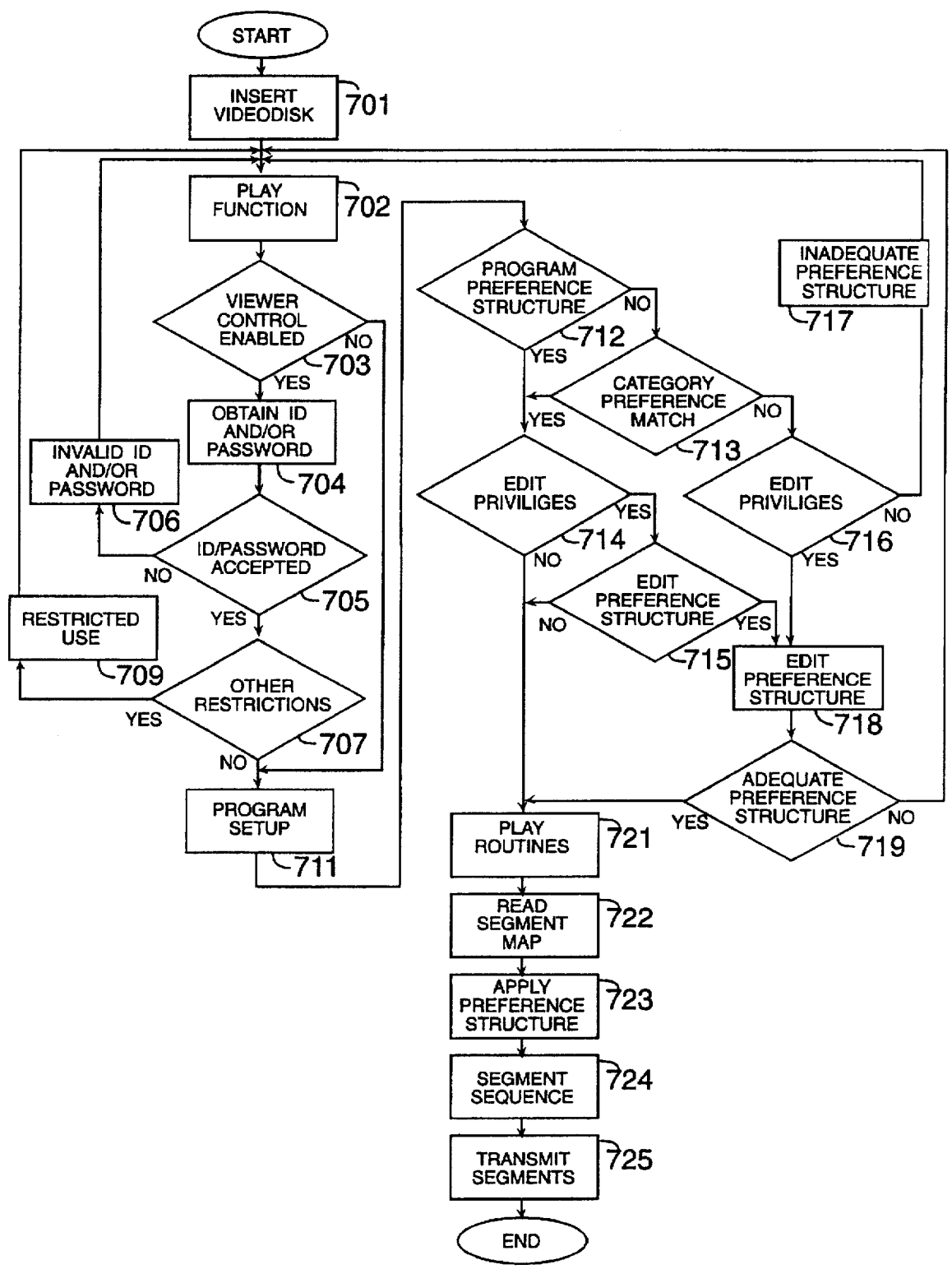
FIG. 6 is a flow chart summarizing the process of a laser videodisc playing as per the present invention.

Referring now to the flow chart of FIG. 6, the steps 700 comprising the method for operating a video disk ("disk") on a laser video disk player ("player") of the present invention, are detailed. The more enhanced version of the laser video disk player of the present invention includes commonly found personal computer elements such as a computer chip, memory, fixed and removable storage, video buffers, firmware, and software to permit the player to behave as a program-specific personal computer. For simplicity these elements and their capabilities are commonly identified herein as the "processor".

Beginning at step 701, the viewer inserts into the player of the present invention the desired disk. Upon selection of the play function 702, the player's processor will issue a command to read the viewer control setup of the player to ascertain if viewer control is enabled 703. If enabled, the player's handshaking routines will request viewer identification and, if required a corresponding password 704. If the viewer identification and password are not found acceptable 705, the appropriate error message is transmitted to the television 706, and the player is returned to a state prior to the viewer play request 702.

If the viewer identification and password are found acceptable 705, the processor checks for other restrictions to a user access 707. These additional restrictions include: time of day restrictions for the user, accumulated usage during specified time frames. If restrictions are enabled that prevent usage 707, the appropriate error message is transmitted to the television 709, and the player is returned to a state prior to the viewer play request 702. The user-permission capability enables a parent to have complete control over the use of the player.

If viewer control is not enabled 703, or if enabled, verification of the user 705 and verification of restrictions permit usage 707, the processor instructs the player to read from the disk program identification data 711. Based on the program identification data, which in addition to including a unique identification code may also contain qualitative and classification program information, the processor will then search to see if an existing viewer preference table for the identified viewer is available at step 712. Otherwise at step 713, the player reads the program category listing structure supplied from the video disk and determines if a viewer preference is established for each of the program categories. Once viewer preference structure exist, the processor verifies set up status for editing privileges 714, so that the viewer has editing privileges for the class of programs to which the present program belongs and the categories included therein, and editing is to be exercised upon the play request. The processor may simply transmit to the television a viewer request to indicate if the existing preference structure is to be edited 715. If at step 714 edit privileges are not available for the viewer, the processor will initiate normal play routines 721. If the viewer indicates that no editing privileges are to be exercised 715, than the processor will initiate normal play routines 721 as well; otherwise, editing of the viewer preference structure occurs at step 718. The edited viewer preference structure is interactively verified 719 until an adequate category preference match as required by the program is established or the viewer selects to exit. Exiting at 719 returns the player to a state prior to the viewer play request 702.

If a viewer preference structure for the login viewer for the program is not available 712 or at least one of the categories of the program is not contained in the viewer preference structure 713, then the processor will verify if edit privileges are available for the viewer for the class of programs and the categories 716. If no edit privileges are available, then the processor transmits an error message 717 to the television and returns the player to a state prior to the viewer play request 702. If edit privileges are available, then editing of the viewer preference structure is available at step 718.

Editing the viewer preference structure at 718 is supervised by the processor to insure that viewer modifications are consistent with the permissions established for that viewer. Individual viewer permissions may be established broadly for any one or more classes of programs or categories, or specifically for any category.

Once editing of the preference structure, as required by the program category listing, is found complete at step 719 the processor initiates play routines 721. These include reading the program segment map 722 from the disk and applying the existing viewer preference structure 723 to determine the segments to be played and their sequence 724. Upon which the processor issues the sequence of player commands to operate the transfer of the video information from the disk to the television 725.

It should be noted that once a basic viewer preference structure and keyword control has been read into the player's memory, and the player viewer control is properly set up, a subsequent playing of any disk conforming to the basic category structure, need only involve inserting the disk into the player and depressing the play button, whereupon the player will automatically initiate playing of the video program without the necessity of any further viewer interaction. If viewer control is enabled, a viewer identification and or password entry would be the only other additional step required.

While an embodiment of the present invention has been explained in terms of a laser video disk player physically accessible by the viewer, variations of this embodiment of the present invention are also possible. For example, the video player need not be physically located near the television set. The patents to Fenwick et al. U.S. Pat. No. 4,947,244 and to Eggers et al. U.S. Pat. No. 4,920,432, by reference incorporated herein, disclose remote video distribution systems such as may be found in a hotel, wherein the viewer is provided remote controlled access to the video resources. Fiber optic communications would easily permit a greater distance between the player and the television.

The embodiment of the present invention also need not be limited by laser video disk technology. The program, the program content map, and user routines may be provided to the viewer in any of a variety of existing and evolving technologies. These technologies include hard formats such as tape, laser disk, magnetic disk, combination laser one side magnetic underside disk, memory chips and modules (e.g. RAM, DRAM, high capacity flash memory, bubble memory); and soft formats, such as an analog or digital cable transmissions, fiber optic transmission, phone and satellite communications.

Additionally, the entire program including all the parallel, overlapping, and transitional segments, and the program content map need not be transmitted to the viewer. The program may be provided to the viewer in the form that results from the execution of the viewer content preference structure, i.e only those segments comprising a continuous logical program that are consistent with the viewer preference structure is transmitted in real-time or a non real-time format.

In a fiber optic based broadband integrated services digital network ("B-ISDN") implementation of the present invention, as previously outlined, the video program is delivered to the viewer via a fiber optic network.

An internal or external modem connects the video player with the required fiber optic linkages and communication software. The capacity, and speed of the player's storage, the size and speed of the player's memory and processor, and the capabilities of the modem device or integrated service digital network retriever transmitter ("ISRT") or video retriever transmitter ("VRT") are dependent on the architecture implemented by the program provider. Preferably, where the entire program is downloaded together with the required program content map and user interface, the storage capacity and transfer rates included in the VRT will be significant.

This requirement may be reduced by applying the viewer preference structure to the program and transmitting, in total or in groups, only those segments to be viewed. Alternatively, where the viewer remains on-line with the program provider during the transmission of the program and utilizes the hardware capabilities of the service provider, a VRT; including only a communication unit without local storage, processing, or memory, would be adequate.

It is within these VRT implementations that the various advantages and capabilities of the present invention are realized. The versatility and usefulness is derived from its two way fiber optic digital linkage to the B-ISDN. In a preferred embodiment of the present invention within a VRT architecture, the viewer or, more appropriately, the user's control of the VRT is either through an infrared control keypad, wired or infrared alphanumeric control keyboard, voice control, or system controls directly on the VRT unit. The VRT will be linked to the user designated digital receiver monitor and to the B-ISDN by means of fiber optic based communication devices. The VRT, monitor and keyboard will provide the functional equivalent of a graphical workstation.

In operation, the VRT normally provides a variety of communication and background services (e.g. videophone, video fax, security, appliance management) to the user and therefore is ready to respond to an active user request. The user control's the VRT's functions by means of one of the control devices listed above, causing the VRT to provide power to the receiver if necessary, and transmitting an appropriate menu, entry screens, or services to the receiver as previously described. The configuration of the handshaking is provided in a flexible and user configureable manner.

The following four examples describe how a user retrieves video programs:

In a first example, a user accesses, by means of the VRT, a program provider of his choice. The user has a variety of ways to retrieve programs including: i) specifying the program's title or code obtained from a reference guide, ii) listing in alphabetical order by title, subject matter, actors, etc. in any combination, iii) tree structure of the program classifications, and iv) keyword searching and retrieval (similar to the Automated Patent Search implementation) enhanced by the program/segments descriptors. Once the program is selected, the user remains on-line utilizing the hardware of the program provider or a more local service center which obtains the program from the program provider. The off-site hardware services will respond to the VRT commands in a manner similar to that detailed previously for the player implementation of the present invention.

In a second example, a user will access a program provider and select a program, as indicated in the example above. Instead of remaining on-line, however, the user requests downloading the selected program. In addition to the program video, the program includes a map of the program segments, any user interface routines particular to the program, and VRT control codes, in a format consistent to that required by the VRT storage capabilities. Utilization of the program will then be analogous to those steps detailed previously for the player implementation of the present invention.

In a third example, a user wishing to retrieve a summary, analysis, and background regarding a particular news event, will use one of the control devices to order the automatic linkage with the B-ISDN service center. The user then enters his/her request, and a keyword analysis of the request will then result in an on-line linkage through the service center to a database containing information on the programbases for the subject matter desired. In this example, a news source remotely located will download a listing of the various sources of summary, analysis, background information, the corresponding segment descriptors where available and necessary, and the overall lengths and costs, if any, of each segment. The user may at his/her leisure produce a request for a video program for his own viewing. In this example, a program comprising a 10 min summary from a news source, a 5 min analysis from another service, a 10 min analysis from a private source, a 30 minute lecture from a university, and copies of a relevant data from the Library of Congress are available.

Once the user finalizes the program segment choices, the request is transmitted to the service center wherein the various providers (libraries) which may be located anywhere in the world are electronically requested to transmit the respective segments/programs, program content maps, and any user routines. These are logically assembled and merged by the service center and retransmitted to the user together with any billing information. The transmission and retransmission of the programs might be on a non real-time compressed digitized device.

The event duration for our example may be 15 minutes of connect time, 2 minutes of transmission time (for the 55 minute "program"). The costs for the service may be less than a conventional movie, total cost could be approximately $6.00 with a partial rebate for the user selection to activate the five minutes of targeted "commercials" that are included. The particular billing methods and apparatus required are currently implemented in other on-line data retrieval services.

Since the VRT is both a retriever and a transmitter, the above "program" might be condensed by the user into a 10 minute summary and a 2 minute personal message and transmitted to another user, incurring connect time and redistribution charges of about $2.00.

In a fourth example, a user may construct a content preference structure of any desired detail, including, for example, a variety of keywords to describe the program's subject matter, the story line, possible endings, and approximate program playing time. The user will transmit this information by means of the VRT to a program provider. The user will further indicate the program's delivery by requirement (minutes, overnight, days), and whether the request is for a single program or a series of programs and their frequency.

The program provider will analyze the user request, search the programbase for a program matching the user's requirements. If the program is found, then program information and billing, if any, are transmitted to the user for approval and subsequent program transmission to the user.

If the program is not found, the user's request is forwarded to an appropriate program producer for possible production. The "custom" programs generally follow a preestablished per-transmitted viewable minute fee structure based on the subject matter and nature of the program. Although other schemes are possible, production will depend on an expected or actual critical mass of viewers and any sponsorship both public and private that may be associated with the program. The systems communication architecture facilitates the communication and marketing required to obtain the necessary viewers and sponsorship for production.

The variety of uses of such an architecture might include: i) science fiction enthusiast causing video production of a particular story, i.e a 21st century version of "Romeo and Juliet"; ii) the desirability and structure of a sequel determined by the consensus of viewers; iii) updating of news stories no longer deemed "current"; iv) Continued appraisal of developments in a specified field or subject area, i.e. significant events which might affect the price of a specified commodity; v) review of a political candidates positions; and vi) product purchasing and utilization information.

It is clearly the intent of the VRT implementation of the present invention to permit user(s) to efficiently obtain a transparently continuous program to be viewed at the time of their choosing, over which they exercise complete control as to the subject matter, form of expression, and other elements comprising the program.

In terms of product and services advertising, and commercials in general, the applicant recognizes that commercials have made possible the growth and development of freely broadcast programming. The variety of viewer supported programing such as PBS, rented video programs, and premium cable channels have struggled to maintain quality programming and remain generally free of commercials by direct viewer payments and contributions. It is intended that the methods of the present invention, that are applied to programming in general, and to commercials in particular, lead to commercials (informationals) of greater value to the viewer and not necessarily to merely censor or exclude commercials.

As alluded to earlier, a viewer may not object to, and in fact may request, the inclusion of commercials, which are informational in nature, presented in a manner consistent with their taste level, for a product or service in which they may have an interest; especially if the acceptance for viewing of such a commercial will additionally reduce the cost of other programming obtained by the viewers. In this context, the subsidizing of a program's cost to the viewer by commercials, is more closely matched to the viewers interest in the subject of the commercial, and to the potential purchase by the viewer of that product or service.

Where the inclusion of commercials is consistent with the viewer-established preference structure and is accepted by the viewer as a condition of value received by the viewer, the transmission of the commercial to the television is promoted by providing special segment codes that would inhibit the player or VRT functions (e.g. viewer preference structure, skip function) from interfering with that transmission.

While a presently preferred form of the present invention has been set forth in summary form here and above, it is to be understood that the invention is not limited thereby. In particular, the steps of the inventive process are interchangeable, may be interchanged and are equivalent. It is to be understood that the specific details shown are merely illustrative and that the invention may be carried out in other

17 ways without departing from the true spirit and scope of the following claims.

What is claimed is:

1. A method of providing videos comprising the steps of:

storing a plurality of previously edited videos and content maps defining a plurality of video segments of a corresponding video;

receiving from a remote video retriever a request for a video;

retrieving video segments responsive to content preferences of a viewer and a content map of the requested video without requiring editing by said viewer; and providing, said video retriever, the retrieved video segments as a continuous version of the requested video, said continuous version being different in length than the length of the requested video.

2. The method of claim 1, wherein said content maps define video segments responsive to a content-category relating to violence.

3. The method of claim 1, wherein the requested video includes within at least one non-sequential video segment.

4. The method of claim 1, wherein said content maps define video segments responsive to a content-category relating to violence, and wherein the requested video includes within at least one non-sequential video segment.

5. A method of providing videos comprising the steps of:

storing a plurality of previously edited videos each having a content map defining a plurality of video segments;

receiving from a remote video retriever a request for a video; and transmitting the requested video to said remote video retriever enabling said remote video retriever to play, responsive to content preferences of a viewer and the content map and without requiring editing by said viewer, a continuous version of the requested video that is different in length than the length of the requested video.

6. The method of claim 5, wherein the requested video includes within at least one non-sequential video segment.

7. The method of claim 5, wherein the content map defines video segments responsive to a content-category relating to violence.

8. A video provider system comprising:

memory means for storing a plurality of previously edited videos each having a content map defining a plurality of video segments;

receiving means for receiving from a remote video retriever a request for a video;

retrieving means for retrieving video segments responsive to content preferences of a viewer and a content map of the requested video without requiring editing by said viewer; and providing means for providing, said video retriever, the retrieved video segments as a continuous version of the requested video, said continuous version being different in length than the length of the requested video.

9. The video provider system of claim 8, wherein a content map defines segments responsive to a content-category relating to violence.

10. The video provider system of claim 8, wherein the requested video includes within at least one non-sequential video segment.

11. The video provider system of claim 8, wherein a content map defines segments responsive to a content-category relating to violence, and wherein the requested video includes within at least one non-sequential video segment.

12. A video provider system comprising:

memory means for storing a plurality of previously edited videos each having a content map defining a plurality of video segments;

receiving means for receiving from a remote video retriever a request for a video; and providing means for providing the requested video to said remote video retriever enabling said remote video retriever to play, responsive to content preferences of a viewer and the content map and without requiring editing by said viewer, a continuous version of the requested video that is different in length than the length of the requested video.

13. The video provider system of claim 12, wherein the requested video includes within at least one non-sequential video segment.

14. The video provider system of claim 12, wherein the content map defines video segments responsive to a content-category relating to violence.

15. A video provider system comprising:

memory means for storing a plurality of previously edited videos and content maps, each of said content maps defining a plurality of video segments of a corresponding video;

receiving means for receiving from a remote video retriever a request for a video; and providing means for providing the requested video and a content map to said remote video retriever enabling said video retriever to play, responsive to content preferences of a viewer and the content map and without requiring editing by said viewer, a continuous version of the requested video that is different in length than the length of the requested video.

16. The video provider system of claim 15, wherein at least one of the videos includes within at least one non-sequential video segment.

17. The video provider system of claim 15, wherein the content map defines video segments responsive to a content-category relating to violence.

* * * * *